United States Patent Office 3,378,744
Patented Apr. 16, 1968

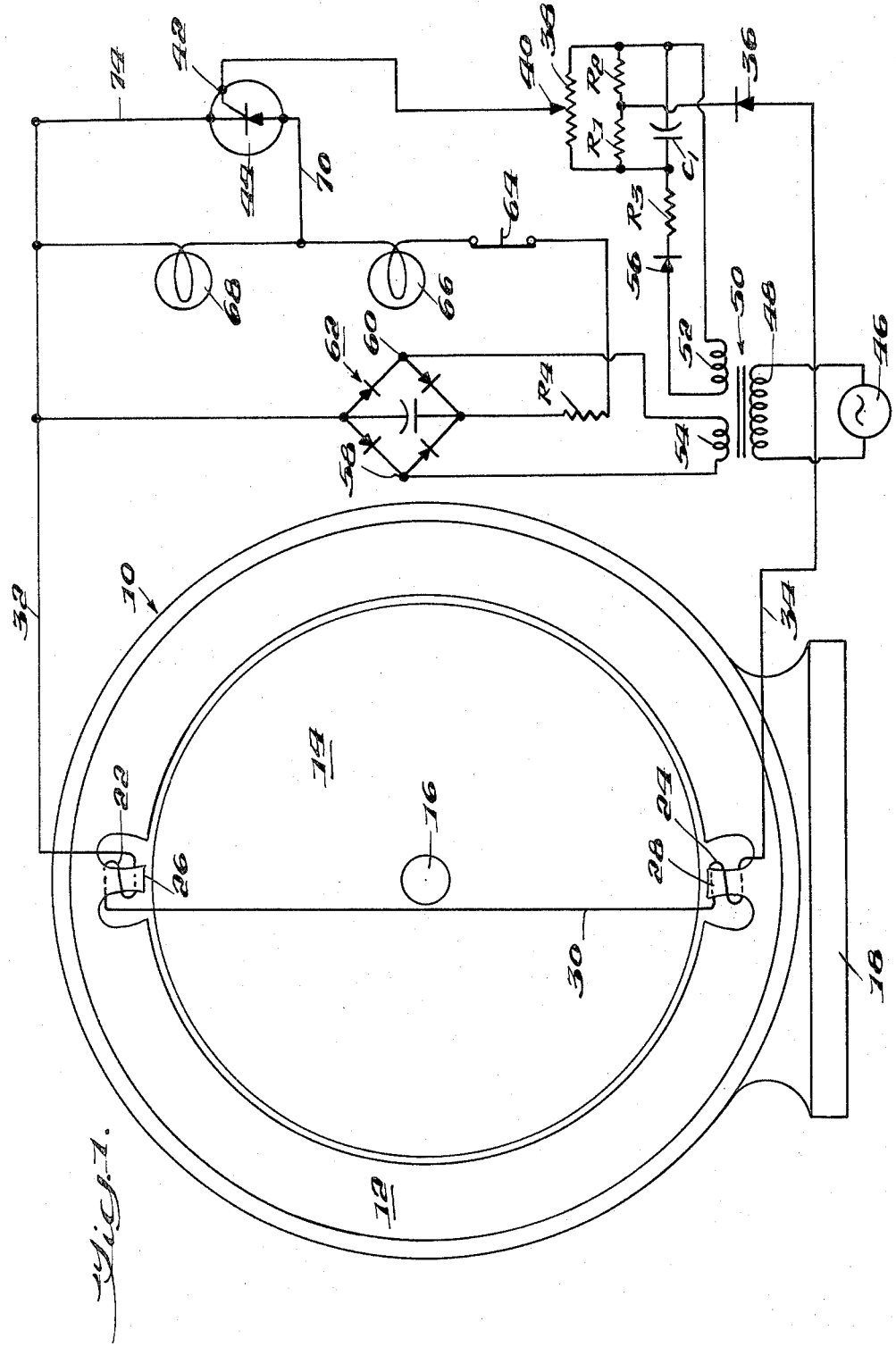

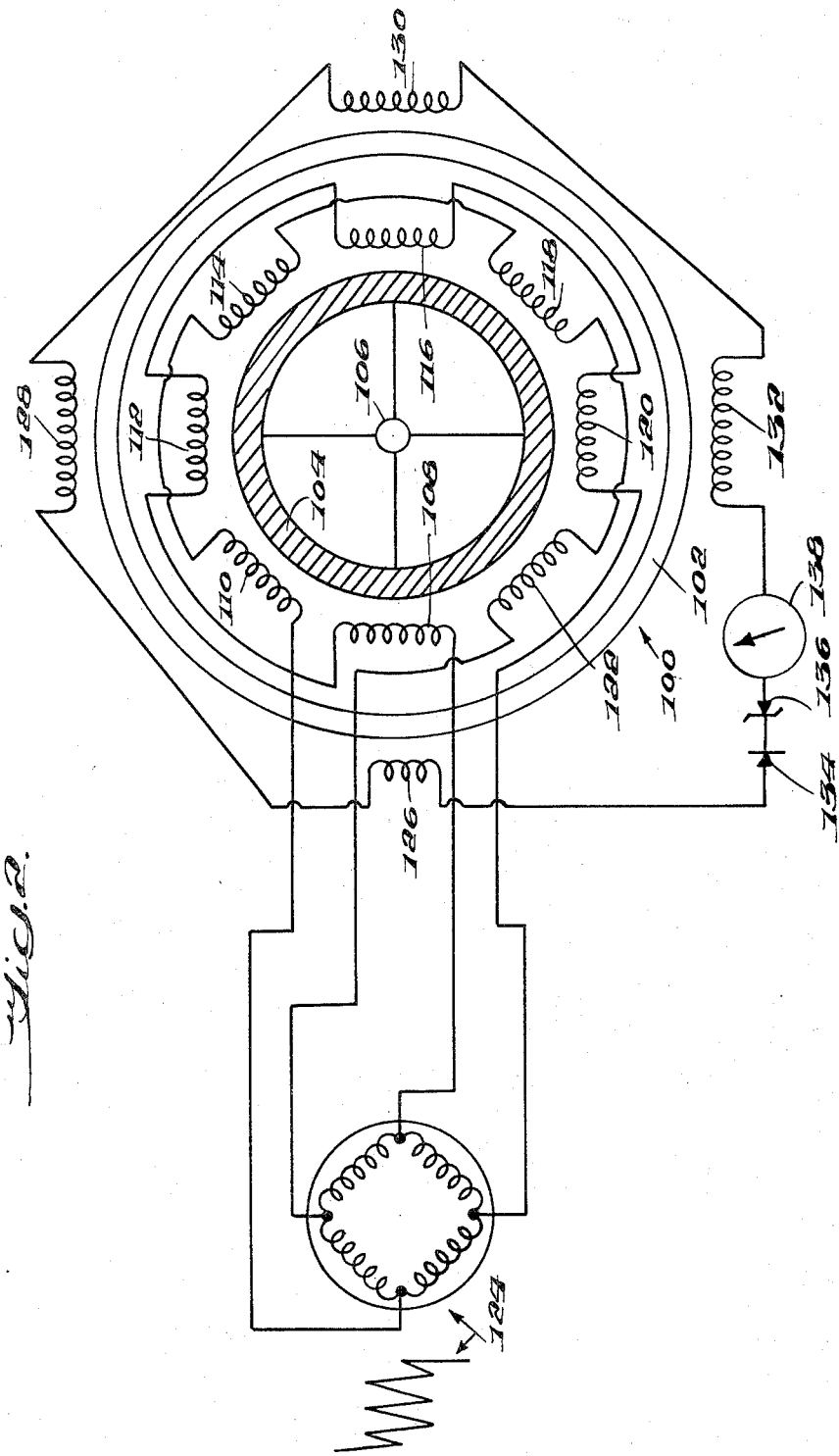

3,378,744
SLIP DETECTION CIRCUIT
John Seymour Seney, Seaford, Del., assignor to E. I. du Pont de Nemours and Company, Wilmington, Del., a corporation of Delaware
Filed Oct. 19, 1965, Ser. No. 497,790
4 Claims. (Cl. 318—167)

ABSTRACT OF THE DISCLOSURE

An auxiliary circuit has flux-sensing coils located adjacent the stator of a synchronous motor and connected to both an avalanche device and a component for indicating variations of the current induced in the coils which variations, in turn, indicate occurrence of pull-out.

This invention relates generally to synchronous electric motors and more particularly to a reliable and inexpensive auxiliary circuit for detecting and indicating variations from synchronous speed.

Precise regulation of process speed is essential to many industrial processes such as, for example, high speed drawing of synthetic polymeric filaments. One route for obtaining this precise speed regulation consists of the use of AC motors operated at synchronous speed as determined by the frequency of a precisely regulated AC supply. Speed changes are made by changing frequency and appropriately adjusting the voltage of the AC supply.

In some synchronous systems, space limitations and economic considerations dictate the use of motors of reduced size. Sudden increases in torque demand by the process may cause the driving synchronous motor to slip temporarily and depart from synchronous speed but return when the torque demand again approaches normal magnitude. Since such deviations from the desired speed may affect properties of the product produced, it is often essential that these transient speed changes be detected and signalled to an operator. Known tachometers or other speed indicators either lack the necessary precision, are excessively costly, require excessive space, or are too complicated for widespread industrial application.

The primary objective of this invention is to provide a slip detection circuit for precisely detecting deviation from synchronous speed for AC motors. A corollary objective is to detect slippage of a synchronous motor with auxiliary circuit components which are simple, reliable and inexpensive. A related objective is to provide an auxiliary circuit with which to detect and then signal occurrence of slip even when transient.

These and other objectives are attained with an auxiliary, slip detection circuit which has at least one flux-sensing coil located in the proximity of the stator of an electric motor normally operable at synchronous speed and components electrically connected to the sensing coil arranged to detect variations of the induced current in the sensing coil responsive to pull-out from synchronous speed and to indicate the occurrence of slipping. The components include a solid state avalanche device series-connected to the sensing coil and an indicator coupled with the solid state device.

Additional objectives and advantages will be apparent from the following description wherein reference is made to the accompanying drawings in which:

FIG. 1 is a schematic circuit diagram of the preferred embodiment of this invention as applied to a synchronous induction motor; and FIG. 2 is a schematic circuit diagram of an alternate embodiment for application to a hysteresis type synchronous motor.

Turning first to FIG. 1, the preferred embodiment is shown in association with a synchronous induction motor 10 of the type disclosed by Bauer et al. in U.S.P. 2,733,362. Motor 10 has a stator 12 mounted on base 18 and a rotor 14 mounted on shaft 16. Stator 12 is of the type used in a standard induction motor. Rotor 14 is segmented and has axially extending, peripheral grooves filled with a non-magnetic, electrically conducting material. The auxiliary circuit of the present invention is accommodated by removing the wedges from adjacent stator slots at two locations, inserting a first auxiliary sensing coil 22 (50 turns of No. 27 wire) around a first tooth 26 and similarly mounting a second coil 24 around a second tooth 28 located approximately 180° from the first tooth. One end of the coil 22 is electrically connected by wire 30 to an end of coil 24. The other end of coil 22 is connected electrically to a wire 32 and the other end of coil 24 is electrically connected to wire 34. Coils 22, 24 are wound on top of the corresponding stator windings, in series-bucking relationship, the consequence of asymmetrical variations being to produce a voltage.

Wire 34 is connected through diode 36 to the midpoint between two equal resistors $R_1$, $R_2$ connected in series. The outer terminals of $R_1$ and $R_2$ are connected to a potentiometer 38, the variable contactor 40 of which is connected to the gate terminal 42 of a silicon controlled rectifier 44. In addition, a capacitor $C_1$ is connected across the outer terminals of resistors $R_1$ and $R_2$. An AC power source 46 is connected across the primary 48 of transformer 50. Transformer 50 has two secondary windings 52, 54. Across the terminals of secondary winding 52, there is connected in series a diode 56, a resistor $R_3$ and capacitor $C_1$. Secondary winding 54 is connected across the AC input terminals 58, 60 of a diode rectifier bridge 62. One output terminal of bridge 62 is connected through a resistor $R_4$, a push-button switch 64, a first lamp 66, a second lamp 68 and thence to line 32. The other output terminal of bridge 62 is connected directly to line 32. To complete the circuit, a wire 70 is connected from the midpoint between lamps 66 and 68 to the anode of SCR 44 and the cathode of SCR 44 is connected by wire 74 to wire 32.

In operation, motor 10 is brought up to synchronous speed and the detection circuit is set by opening switch 64 momentarily. Since flux-sensing coils 22, 24 are connected in series-bucking relationship, the voltages induced from magnetized rotor 14 cancel out, i.e., little or no voltage appears across wires 32, 34 at synchronous speed. However, when an abnormally high load is placed on the shaft 16 of motor 10 and the motor approaches the pull-out point where slippage from synchronous speed will occur, a spike of voltage appears across wires 32, 34. This spike in rotor flux sensed by coils 22, 24 and is impressed, through resistors $R_1$, $R_2$ and potentiometer 38, on the gate terminal 42 of SCR 44. Potentiometer 38 has been previously adjusted such that the auxiliary supply from secondary winding 52 is just insufficient to fire the SCR. Firing of the SCR shorts lamp 68, leaving lamp 66 as the only lamp across the output of rectifier bridge 62. Thus, lamp 66 is made to glow brightly compared to its normal condition. Since SCR 44 is supplied by DC, lamp 66 continues to burn brightly until push button 64 is again operated to deenergize the SCR and thereby reset the indicating circuit. This is true even when motor 10 may have pulled back into synchronous speed in the meantime.

Thus, there is provided by this invention a very sensitive means for detecting an occurrence of pull-out of a synchronous induction motor from synchronous speed and providing an indication of such a deviation which is maintained even though the motor returns to synchronous speed. The required modification to the motor and the auxiliary detection and indicating circuitry are not only inexpensive but also require very little maintenance or adjustment for operation over long periods of time.

In FIG. 2, a second embodiment of the slip detection circuit has been shown in association with a typical hysteresis type synchronous motor (e.g., motor Type No. GLH-420 sold by Electric Indicator Co.). The motor 100 is schematically shown to comprise a stator 102 inside of which is mounted a rotor 104 on shaft 106. The stator windings 108–122 of the motor are shown connected in two separate groups to a two phase AC power supply 124. Four rotor flux-sensing coils 126–132 have been added to the motor outside the stator 102 but in close proximity thereto. Coils 126–132 are connected in series-aiding relationship and in series with a rectifying diode 134, a Zener bias diode 136 and a synchronization detector/indicator in the form of a DC ammeter 138.

In operation, as motor speed is raised toward synchronization, little or no reading appears on meter 138. But just as the motor pulls into synchronization a sudden increase in current passes through Zener diode 136 and meter 138 so that an obvious visual indication of synchronous speed will be furnished. If increasing load is imposed on shaft 106, such that pull-out from synchronization is approached, the indication on meter 138 suddenly drops at the precise moment that synchronous speed is lost.

Thus, a very simple reliable means for detecting pull-out from synchronous speed has been provided in this embodiment. If desired, a trip circuit could be provided in place of or in parallel with meter 138 to provide a further indication of pull-out from the synchronous speed in a manner similar to that shown for the embodiment of FIG. 1.

Numerous modifications and adaptations of the illustrated slip detection circuits will occur to those skilled in the art without departure from the invention which accordingly is intended to be limited only by the scope of the appended claims.

Having thus described the invention, what is claimed as new and desired to be secured by Letters Patent is:

1. In combination with a synchronous motor having a stator and rotor, a slip detection circuit comprising a rotor flux-sensing coil mounted on the stator, a solid state avalanche device and an indicating component coupled electrically to said avalanche device, the latter being series-connected with said coil in a closed loop which is electrically isolated from the motor.

2. The motor of claim 1 wherein said loop has at least two series-connected rotor flux-sensing coils mounted on the stator.

3. The motor of claim 2 wherein said coils are in series bucking relationship and said device is a silicon controlled rectifier having a gate terminal connected to one of the coils.

4. The motor of claim 2 wherein said coils are in series-aiding relationship and said device is a Zener diode connected in series with said coils.

References Cited
UNITED STATES PATENTS

| | | | |
|---|---|---|---|
| 2,415,405 | 2/1947 | Barney | 318—184 |
| 2,941,120 | 6/1960 | Harmon et al. | 317—5 |
| 3,098,958 | 7/1963 | Katz | 318—138 |

ORIS L. RADER, *Primary Examiner.*

G. RUBINSON, *Assistant Examiner.*